US008601919B1

(12) United States Patent
King

(10) Patent No.: US 8,601,919 B1
(45) Date of Patent: Dec. 10, 2013

(54) METHOD OF BRAKING A CHAIN SAW

(76) Inventor: William C. King, Mercersburg, PA (US)

( * ) Notice: Subject to any disclaimer, the term of this patent is extended or adjusted under 35 U.S.C. 154(b) by 824 days.

(21) Appl. No.: 12/589,084

(22) Filed: Oct. 19, 2009

Related U.S. Application Data

(63) Continuation-in-part of application No. 11/823,332, filed on Jun. 28, 2007, now abandoned, and a continuation-in-part of application No. 11/286,404, filed on Nov. 25, 2005, now Pat. No. 7,640,669, and a continuation-in-part of application No. 10/639,739, filed on Aug. 12, 2003, now abandoned, and a continuation-in-part of application No. 10/047,402, filed on Jan. 15, 2002, now Pat. No. 6,944,958, and a continuation-in-part of application No. 09/853,942, filed on May 11, 2001, now Pat. No. 6,769,187.

(60) Provisional application No. 60/245,939, filed on Nov. 6, 2000, provisional application No. 60/290,226, filed on May 11, 2001.

(51) Int. Cl.
*B23D 57/02* (2006.01)
*B27B 17/02* (2006.01)

(52) U.S. Cl.
USPC .......... 83/13; 83/68; 83/788; 30/381; 30/383; 188/65.1; 299/12; 299/82.1

(58) Field of Classification Search
USPC .......... 30/381–387; 83/814, 820, 13, 68, 788; 188/65.1; 299/12, 82.1, 83.1, 84.1
See application file for complete search history.

(56) References Cited

U.S. PATENT DOCUMENTS

| | | | | | |
|---|---|---|---|---|---|
| 1,260,702 | A | | 3/1918 | Olson | |
| 1,562,732 | A | | 11/1925 | Arsneau83 | 83/798 |
| 2,061,195 | A | * | 11/1936 | Horner | 299/82.1 |
| 2,179,433 | A | * | 11/1939 | Sifers et al. | 299/82.1 |
| 2,316,997 | A | | 4/1943 | Smith | 30/385 |
| 2,532,981 | A | | 12/1950 | Wolfe | 30/385 |
| 3,267,973 | A | * | 8/1966 | Beard | 30/386 |
| 3,390,710 | A | | 7/1968 | Cookson et al. | |
| 3,485,326 | A | | 12/1969 | Wilkin | 186/136 |
| 3,485,327 | A | * | 12/1969 | Gudmundsen | 188/136 |
| 3,596,689 | A | | 8/1971 | Oehrli | 30/138 |
| 3,664,390 | A | | 5/1972 | Mattsson et al. | 30/381 |
| 3,793,727 | A | | 2/1974 | Moore | 30/383 |
| 3,872,901 | A | | 3/1975 | Bernard | 144/4.1 |
| 4,060,985 | A | | 12/1977 | Fukushima | 60/319 |
| 4,152,833 | A | | 5/1979 | Phillips | 30/382 |
| 4,361,960 | A | | 12/1982 | Halverson | 30/385 |
| 4,373,265 | A | | 2/1983 | van Halderen | 30/383 |
| 4,382,334 | A | | 5/1983 | Reynolds | 30/386 |
| 4,534,112 | A | | 8/1985 | Bass | 30/383 |
| 4,594,780 | A | | 6/1986 | Schliemann et al. | 30/382 |
| 4,611,401 | A | | 9/1986 | Piller | 30/387 |
| 4,625,406 | A | | 12/1986 | Fushiya et al. | 30/381 |
| 4,677,746 | A | | 7/1987 | Raiski | 30/122 |
| 4,862,821 | A | * | 9/1989 | Ballantyne | 114/293 |
| 4,924,577 | A | | 5/1990 | Leini | 30/387 |
| 5,101,567 | A | | 4/1992 | Cool | 30/382 |

(Continued)

FOREIGN PATENT DOCUMENTS

SU 1395433 * 5/1988

*Primary Examiner* — Clark F. Dexter
(74) *Attorney, Agent, or Firm* — James D. Welch

(57) ABSTRACT

A method of applying frictional braking to motion of a cutter providing chain thereof, involving the entering of an insertional element into the chain channel guide.

1 Claim, 9 Drawing Sheets

(56) References Cited

U.S. PATENT DOCUMENTS

| | | | | | |
|---|---|---|---|---|---|
| 5,129,160 | A | | 7/1992 | Bell | 30/383 |
| 5,174,029 | A | | 12/1992 | Talberg | 30/386 |
| 5,233,750 | A | | 8/1993 | Wolf et al. | 30/382 |
| 5,249,362 | A | | 10/1993 | Harding | 30/383 |
| 5,272,813 | A | | 12/1993 | Wolf et al. | 30/298.4 |
| 5,445,365 | A | | 8/1995 | Forderer | 267/137 |
| 5,491,899 | A | | 2/1996 | Schliemann et al. | 30/386 |
| 5,522,143 | A | | 6/1996 | Schliemann et al. | 30/386 |
| 5,528,835 | A | | 6/1996 | Ra | 30/386 |
| 5,640,773 | A | | 6/1997 | Haertlein | 30/382 |
| 5,653,028 | A | * | 8/1997 | Hashimoto | 30/123.4 |
| 5,791,057 | A | | 8/1998 | Nakamura et al. | 30/381 |
| 6,148,524 | A | | 11/2000 | Nitschmann | 30/383 |
| 6,161,453 | A | * | 12/2000 | Hensley | 76/38 |
| 6,769,187 | B2 | | 8/2004 | King | 30/383 |
| 6,944,958 | B1 | | 9/2005 | King | 30/387 |
| 8,398,640 | B2 | * | 3/2013 | Hawkins et al. | 606/79 |

* cited by examiner

METHOD OF BRAKING A CHAIN SAW

This Application is a CIP from Utility patent application Ser. Nos. 11/823,332 filed Jun. 28, 2007 (abandoned); and 11/286,404 filed Nov. 25, 2005 (now U.S. Pat. No. 7,640, 669); and 10/639,739 filed Aug. 12, 2003 (abandoned); and 10/047,402 filed Jan. 15, 2002 (now U.S. Pat. No. 6,944,958); and 09/853,942, filed May 11, 2001 (now U.S. Pat. No. 6,769, 187). Further, from the identified CIP Applications this Application Claims Benefit from Provisional Patent Application Ser. Nos. 60/245,939, filed Nov. 6, 20000, and 60/290,226 filed May 11, 2001.

TECHNICAL AREA

The present invention relates to chain saws, and more particularly to a system for applying frictional braking to motion of a cutter providing chain thereof involving the entering of an insertional element into the chain channel guide.

BACKGROUND

Chain saws are well know means for cutting wood and the like and used properly can greatly reduce work, however, if not used carefully user injury can occur. As a result, safety features are desirable. Critical to optimum operation is the capability of a chain saw system to maintain proper tension on a cutter blade containing chain, and critical to safety is the ability to stop a cutter blade containing chain from moving when the motor is running but the chain saw is not being applied to useful work. That is, efficient chain saw chain tensioning and braking systems provide utility. Further, it must be understood that chain saws are very low torque, but high speed systems that derive cutting ability by generating high chain speed. That is, at a given torque, the cutting power is directly proportional to chain speed. It is therefore common for a chain saw to stall in use due to minor chain pinching, taking too big a "bite" of, or causing too much down force on, an item being cut. Further, chain pinching and the like is more likely when chain tension is not proper, and it is noted, too high a tension in a chain saw chain can cause a chain motion stopping, (ie. braking), result.

It is in light of the foregoing it is generally disclosed at this point that the present invention is an assisted braking system and method for application to chain saw chains.

Patents identified in searching of Parent Applications are:

U.S. Pat. No. 5,528,835 to Ra;
U.S. Pat. No. 5,174,029 to Talberg;
U.S. Pat. Nos. 5,491,899, 5,522,143 and U.S. Pat. No. 4,594,780 to Schliemann et al.;
U.S. Pat. No. 5,233,750 to Wolf et al.;
U.S. Pat. No. 5,101,567 to Cool;
U.S. Pat. No. 3,793,727 to Moore;
U.S. Pat. Nos. 4,924,577 and 4,611,401;
U.S. Pat. No. 5,445,365 to Forderer;
U.S. Pat. No. 5,249,362 to Harding; and
U.S. Pat. No. 4,382,334 to Reynolds.

Patents which mention magnetic material were applied in a chain saw, and were cited by the Examiner Prosecution of a Parent Application are:

Patent by Fukushima, U.S. Pat. No. 4,060,985;
Patent by VanHalderen, U.S. Pat. No. 4,373,265;
Patent by Bass, U.S. Pat. No. 4,534,112;
Patent by Raiski, U.S. Pat. No. 4,677,746;
Patent by Dooley, U.S. Pat. No. 3,857,180;
Patent by Reynolds, U.S. Pat. No. 4,382,334;
Patent by Wilkin, U.S. Pat. No. 3,485,326;

Additional Patents identified with the presently Claimed invention in mind are:

Patent by Nakamuraetal, U.S. Pat. No. 5,791,057;
Patent by Haertlein, U.S. Pat. No. 5,640,773;
Patent by Wolf et al., U.S. Pat. No. 5,272,813;
Patent by Bell, U.S. Pat. No. 5,129,160;
Patent by Fushiya et al., U.S. Pat. No. 4,625,406;
Patent by Phillips, U.S. Pat. No. 4,152,833;
Patent by Moore, U.S. Pat. No. 3,793,727;
Patent by Oebrli, U.S. Pat. No. 3,596,689
Patent by Mattson, U.S. Pat. No. 3,664,390; and
EP 235670.

Patents identified by the Examiner in a Parent Application are: U.S. Pat. Nos. 1,562,732 to Arsneau; 2,316,997 to Smith; 2,532,981 to Wolfe and 3,872,901 to Bernard.

Parent Patents to the Inventor are:

U.S. Pat. No. 6,769,187; and
U.S. Pat. No. 6,944,958.

No Patent or combination of Patents, however is believed to obviate a chain saw which comprises a system for applying frictional braking to motion of a cutter providing chain thereof involving the entering of an insertional element, or equivalent, into the chain channel guide.

DISCLOSURE OF THE INVENTION

The present invention is a chain saw comprising a motor inside a housing, a cutter providing chain saw chain comprised of links which include chain link mating elements, and an elongated support extending outward from inside said housing. Said motor and chain saw chain are functionally interconnected inside said housing such that operation of said motor applies motion producing force to said chain saw chain. In the outer surface of said elongated support there is present a continuous chain channel guide into which said chain link mating elements slideably insert, such that during normal operation said chain link mating elements slide essentially freely through said continuous chain channel guide when forced to do so by operation of said motor. Said continuous chain channel guide further comprise means present therein which allows effecting an impeded chain channel guide, said means which allows effecting an impeded chain channel guide serving to, when operated, impede the slideability of a chain saw chain in said continuous chain channel guide. Said means which allows effecting an impeded chain channel guide can be described as being an insertional element affixed to a control means for causing said insertional element to extend into the continuous chain channel guide and contact said chain saw chain when braking is desired. In use said control means for causing said insertional element to extend into the continuous chain channel guide is operated to cause said insertional element to not extend into said continuous chain channel guide during normal operation, but to extend into said continuous chain channel guide and contact said chain saw chain when braking of chain saw chain motion is desired. It is noted that said means which allows effecting an impeded chain channel guide can comprise at least one collapsible region in said chain channel guide or be at least one per se. insertional element which is entered thereinto laterally through a means for entering an insertional element or vertically from a resting location in a channel in the elongated support.

Said control means for causing said insertional element to extend into the continuous chain channel guide can comprise an insertional element affixed to a lever arm, said insertional element being projected into a vertically oriented channel in said elongated support which provides access to the chain channel guide. Said lever arm is pivotally connected to said elongated support and said lever arm further having a brake operation handle affixed thereto. In operation when a user applies force to said brake operation handle said lever arm rotates to cause said insertional element to move into said chain channel guide when braking of said chain saw chain motion is desired, and out of said chain channel guide when braking of said chain saw chain motion is not desired.

The present invention can further comprise, in said elongated support, a slit in a longitudinal direction as said chain saw is viewed in side elevation, such that the upper and lower portions above and below the longitudinal slit can be separated from one another at at least one location along the longitudinal extent thereof, said longitudinal slit enabling separation of the upper and lower portions of said elongated support, thereby the causing of a "stretching" of the chain saw chain, such that when said stretching is appropriate, the chain saw chain is properly tensioned to facilitate motion of said chain saw chain.

The present invention can further comprise, in said elongated support, a slit in a lateral direction as said chain saw is viewed from above, such that the portions of the chain channel guide before and after the lateral slit can be separated from one another at at least one location along the longitudinal extent thereof, said lateral slit enabling separation of the portions of said elongated support separated thereby, thereby the causing of impediment of motion of a chain saw chain therethrough.

A method operating a chain including causing motion of a chain saw chain and the stopping thereof, comprising the steps of:

a) providing a chain saw comprising a motor inside a housing, a cutter providing chain saw chain comprised of links which include chain link mating elements, and an elongated support extending outward from inside said housing, said motor and chain saw chain being functionally interconnected inside said housing such that operation of said motor applies motion producing force to said chain saw chain; in the outer surface of said elongated support there being present a continuous chain channel guide into which said chain link mating elements slideably insert, such that during normal operation said chain link mating elements slide essentially freely through said continuous chain channel guide when forced to do so by operation of said motor, said continuous chain channel guide having means present therein which allows effecting an impeded chain channel guide, said means which allows effecting an impeded chain channel guide serving to, when operated, impede the slideability of a chain saw chain in said continuous chain channel guide;

said means which allows effecting an impeded chain channel guide being an insertional element affixed to a control means for causing said insertional element to extend into the continuous chain channel guide and contact said chain saw chain when braking is desired;

such that in use said control means for causing said insertional element to extend into the continuous chain channel guide is operated to cause said insertional element to not extend into said continuous chain channel guide during normal operation, but to extend into said continuous chain channel guide and contact said chain saw chain when braking of chain saw chain motion is desired;

b. causing said insertional element to not be present in the continuous chain channel guide and causing said motor to cause said chain saw chain to slide essentially freely move therethrough;

c. causing said insertional element to be entered into the chain channel guide such that it contacts said chain saw chain, thereby impeding its motion.

Said method of operating a chain including causing motion of a chain saw chain and the stopping thereof can involve, in the step of providing a chain saw with a means present therein which allows effecting an impeded chain channel guide:

- providing a continuous chain channel guide in which is present a means for laterally collapsing at least a portion thereof; and/or
- providing a continuous chain channel guide in which is present a means for laterally entering an insertional element thereinto; and/or
- providing a continuous chain channel guide in which is present a means for vertically entering an insertional element thereinto.

Further, the step of providing a chain saw with a means present therein which allows effecting an impeded chain channel guide can involve providing an elongated continuous chain channel guide into which is cut a longitudinally or laterally oriented slit in said elongated support.

DISCLOSURE IN PARENT APPLICATIONS

To provide better insight to chain saws in general and the present invention, material previously disclosed in Parent Applications is repeated herein.

A different approach previously disclosed provides that a chain saw comprise a centrifugal clutch that not only utilizes a radial motion of wedge shaped elements therein to mediate transfer of motion from a motor to a chain saw chain, but also provides a sprocket that moves laterally when said wedge shaped elements move radially. The sprocket comprises a gear, (in combination said sprocket and gear are termed a "gear means" herein), that drives the chain saw chain when caused to rotate, but when not so applied said gear means is caused to move laterally into contact with a braking material, said contact serving to effect friction braking of the gear means motion.

The presently discussed invention is then primarily a chain saw comprising:

- a motor housing;
- a chain saw chain comprised of cutters and links including chain saw link mating elements; and
- an elongated support having a continuous chain channel guide through which said chain saw chain slideably moves in use.

Said motor and chain saw chain being functionally interconnected via a clutch means for transferring motion, said clutch means comprising:

- a clutch housing;
- within said clutch housing there being a clutch plate which comprises at least one channel which projects radially from a central location thereof, to which central location is attached a rod which is functionally attached to said motor, said rod being projected perpendicularly to a plane formed by said clutch plate, each of said at least one channel having functionally slideably present therewithin a wedge element which is substantially centrally located when said clutch plate is at rest, and which wedge element(s) slideably move radially outward in said at least one channel when said clutch plate is caused to rotate about said rod.

Said clutch plate further comprises gear means which mesh with said chain saw chain, said gear means being functionally contacted by said wedge elements in said at least one channels in a manner that results in said gear means moving laterally, as viewed in elevation, when said wedge element(s) slide radially in said at least one channel.

The improvement is that said clutch housing comprises means which move said clutch plate/gear means laterally, as viewed in elevation, into contact with brake material when said wedge elements are located substantially centrally in said at least one channel in said clutch plate, said contact between said gear means and clutch housing serving to effect a frictional braking of said clutch plate.

Said means which move said clutch plate/gear means laterally comprises at least one selection from the group consisting of:

magnetic material; and a spring;

positioned to effect said lateral motion of said clutch plate/gear means when said wedge elements are located substantially centrally in said at least one channel in said clutch plate.

Additional previously disclosed material provides that a continuous channel guide in an elongated support through which said chain saw chain slideably moves in use, has a slit in a manner selected from the group consisting of:

in a longitudinal direction as said chain saw is viewed in side elevation, such that the upper and lower portions above and below the longitudinal slit can be offset from one another at at least one location along the longitudinal extent thereof; and in a lateral direction as said chain saw is viewed from atop, such that the portions of the continuous chain channel guide on either side of the lateral slit can be offset from one another at at least one location along the longitudinal extent thereof;

the purpose of said slit being to allow discontinuity of the continuous channel guide in said elongated support through which said chain saw chain slideably moves, by causing as offset of said channel guide from one side of said slit to the other when braking is desired.

Said chain saw elongated support can be in an offset normally open position, from one side of said slit to the other, unless a user causes it to be closed by operation of a control means, or can be caused to be in a normally closed position, from one side of said slit to the other, unless a user causes it to be separated by operation of a control means.

The presently discussed invention, can also be described as a chain saw comprising:

a motor;

a chain saw chain comprised of cutters and links which include chain link mating elements, and an elongated support having a continuous chain channel guide through which said chain saw chain slideably moves in use.

Said motor and chain saw chain are functionally interconnected via a clutch means for transferring motion, said clutch means comprising:

a clutch housing;

within said clutch housing there being a clutch plate which comprises at least two channels which project radially from a central location thereof, to which central location is attached a rod which is functionally attached to said motor, said rod being projected perpendicularly to a plane formed by said clutch plate, each of said at least two channels having functionally slideably present therewithin a wedge element which is substantially centrally located when said clutch plate is at rest, and which wedge elements slideably move radially outward in said channels when said clutch plate is caused to rotate about said rod. Said clutch means further comprising gear means which mesh with said chain saw chain, said gear means being functionally contacted by said wedge elements in said at least two channels in a manner that results in said gear means moving laterally, as viewed in elevation, when said wedge elements slide vertically radially in said at least two channels. Again, the improvement is that said clutch housing comprises means which move said clutch plate/gear means laterally, (eg. magnetized material or axial spring), as viewed in elevation, into contact therewith when said wedge elements are located substantially centrally in said at least two channels in said clutch plate, said contact between said gear means and clutch housing serving to effect a braking of said clutch plate. And said chain saw can include in a continuous channel guide in said elongated support through which said chain saw chain slideably moves in use, a lateral slit present therein which can be caused to effect an offset of said continuous chain channel guide from, as viewed in side elevation, the top of said lateral slit to the bottom thereof and/or, as viewed from the top, from one side of said lateral slit to the other side thereof. The purpose of said slit being slit being to allow offset of said channel guide, through which said chain saw chain slideably moves, from one side of said lateral slit to the other when braking of the chain saw chain is desired.

Previously disclosed in application Ser. Nos. 10/047,402 and 09/853,942, was a system for a continuously adjustable, (within limits of operation), means for tensioning Chain Saw Chains, said system being adaptable to application in braking the motion of chain saw chains. It is first noted that Chain Saw Blade containing Chains move in a Chain Saw Blade Guide Means in the periphery of an Elongated Support Means which projects from a Motor Housing of a Chain Saw System, and said Chain Saw Chains must have properly tensioned contact with the Guide Means to facilitate functional motion thereof. Various approaches to adjusting tension have been developed, but none are known that provide continuous adjustment over an allowed range. The previously disclosed system enables continuously adjustable tensioning by splitting the Elongated Support Means Longitudinally, as viewed in side elevation, such that upper and lower portions above and below a Longitudinal Slit can be separated from one another. Such separation in turn causes a "stretching" of the Chain Saw Chain. Said system comprises means for fixing in place the upper and lower portions above and below the Longitudinal Slit with respect to one another once they are properly separated apart, hence allows setting of the tensioning of the chain saw chain.

A variation of the system allows for applying Motion Braking to a Chain saw Chain by separating the upper and lower portions of the elongated support to the point that resistance to the chain saw chain motion in said guide means is developed which is sufficient to stop the chain saw chain motion. That is, the previously disclosed system can be applied to develop resistance to Chain Saw chain motion by splitting the Elongated Support Means laterally, as viewed in side elevation, by causing upper and lower portions above and below the Longitudinal Slit to be separated from one another. Such separation in turn causes a "stretching" of the Chain Saw Blade, and when this effect is sufficient, it leads to stopping of the motion of the Chain Saw Blade through the Chain Saw Blade Guide Means in the periphery of an Elongated Support Means.

The previously disclosed invention then was a chain saw comprising a motor inside a housing, a cutter providing chain saw chain comprised of links which include chain link mating elements, and an elongated support extending outward from inside said housing, said motor and chain saw chain being functionally interconnected inside said motor housing such that operation of said motor applies motion producing force to said chain saw chain. In the outer surface of said elongated support there is present a continuous chain channel guide into which said chain link mating elements slideably insert, such that during normal operation said chain link mating elements slide essentially freely through said continuous chain channel guide when forced to do so by operation of said motor, said elongated support being slit in a longitudinal direction as viewed in side elevation, such that the upper and lower portions above and below the Longitudinal Slit can be separated from one another, said Longitudinal Slit enabling separation of the upper and lower portions of said elongated support, thereby the causing of a "stretching" of the Chain Saw Chain, such that when said stretching is appropriate, the chain saw chain is properly tensioned to facilitate motion of said Chain Saw blade.

Said chain saw can provide that said elongated support is caused to be in an offset normally open position, from one side of said Longitudinal Slit to the other, unless a user causes it to be closed by operation of an a control means. Alternatively, said elongated support can be caused to be in a normally closed position, from one side of said Longitudinal Slit to the other, unless a user causes it to be separated by operation of an a control means. Further, the control means can be external to the Longitudinal Slit, or internal to the Longitudinal Slit.

An alternative recitation of a previously disclosed invention system provides for a chain saw comprising a motor inside a housing, a cutter providing chain saw chain comprised of links which include chain link mating elements, and an elongated support extending outward from inside said housing, said motor and chain saw chain being functionally interconnected inside said housing such that operation of said motor applies motion producing force to said chain saw chain. In the outer surface of said elongated support there is present a continuous chain channel guide into which said chain link mating elements slideably insert, such that during normal operation said chain link mating elements slide essentially freely through said continuous chain channel guide when forced to do so by operation of said motor. The continuous chain channel elongated support has a longitudinally oriented slit therein as viewed in side elevation, such that the upper and lower portions above and below the Longitudinal Slit can be separated from one another, said Longitudinal Slit enabling separation of the upper and lower portions of said elongated support, thereby the causing of a "stretching" of the Chain Saw Blade, such that when said stretching is sufficient, the chain saw chain has braking applied thereto, and is prevented from moving.

A method of operating a chain including causing motion of a chain saw chain and the stopping thereof, comprising the steps of:

a. providing a chain saw as described above;

b. causing said upper and lower portions of said elongated support to be appropriately separated from one another, such that slideability of said chain saw blade in said continuous chain channel guide is optimized, or so that its motion is prevented.

Said method can, in place of, or in addition to step b. include a step of:

c. causing adjusting the distance between the upper and lower portions above and below the Longitudinal Slit to brake the chain saw chain motion.

Continuing, for additional insight, it is again noted that it was related in co-pending patent application Ser. No. 09/853,942, that chain saws are very low torque, but high speed systems that derive cutting ability by generating high chain speed. That is, at a given torque, the cutting power is directly proportional to chain speed. It is therefore common for a chain saw to stall in use due to minor chain pinching, taking too big a "bite" of, or causing too much down force on, an item being cut. Further, chain pinching and the like is more likely when chain tension is not proper, and it is noted, too high a tension in a chain saw chain can cause a chain motion stopping, (ie. braking), result. It is such insight which initially led to the invention disclosed in co-pending application Ser. No. 09/853,942, which invention involves cutting a Lateral Slit into the Continuous Chain Channel Guide Upper or Lower surface, (typically the Upper surface near an oil entry port), so that the centrally located Channel region on one side of the resulting Lateral Slit can be, when desired, dislocated with respect to the centrally located Channel region on the other side of said Lateral Slit.

The purpose is that so, in use, when it is desired to stop the Chain Saw Chain from moving, causing the identified central Channel dislocation causes spread of adjacent Chain Saw Chain Links, elements of which adjacent Links then collide with edges of a dislocated central Channel region. This, in combination with other frictional interaction caused between the chain and offset channel regions, one side of said Lateral Slit to the other, provides effective "Braking", thereby causing the chain saw chain to stop.

The preferred embodiments of the previously disclosed chain saw chain braking system provided for the natural positioning of the centrally located Channel region in one resulting side of the cut Upper or Lower surface of the Elongated Support to be dislocated, (ie. not aligned), with respect to the centrally located Channel region in the other side, such that a User must apply central Channel region aligning force to position the centrally located Channel regions on both sides of the Lateral Slit to be aligned, thereby allowing the Blade Containing Links in the Chain Saw Chain to slideably travel in an elongated "circle" around said Upper and Lower surfaces of said Elongated Support.

A preferred embodiment of the previously taught chain saw chain motion braking system provides for a Dumbbell shaped element to effect the alignment of centrally located Channel regions by a User applied force which causes said Dumbbell element to move from being positioned on one side of the Lateral Slit to a position where it straddles the Lateral Slit. One embodiment provides that the Elongated Support be cut in two places, thereby providing a segment thereof which can be positioned such that the centrally located Channel therein is caused to be misaligned with centrally located Channel regions on either side of the two laterally oriented slits.

More precisely, the preferred embodiment of the previously disclosed invention is a chain saw comprising a motor inside a housing, a blade or cutter providing chain saw chain comprised of links which include chain link mating elements, and an elongated support extending outward from inside said housing, said motor and chain saw chain being functionally interconnected such that operation of said motor applies motion producing force to said chain saw chain. While not of Patentable importance, it is noted that the motor and chain saw chain typically are functionally interconnected inside said housing by a sprocket means which is affixed to the motor and engages the chain. Continuing, the outer perimeter surface of said elongated support has present an essentially centrally positioned continuous chain channel guide into which said chain link mating elements slideably insert. As with any conventional chain saw, during normal operation wherein the chain saw is used to cut such as wood etc., said chain link mating elements slide essentially freely through said continuous chain channel guide when forced to do so by operation of said motor. A distinguishing attribute of the preferred embodiment of the previously disclosed invention, however, is that in a previously disclosed invention chain saw the continuous chain channel guide has at least one Lateral Slit present therein which allows effecting an offset of said continuous chain channel guide from one side thereof to the other, said offset, when caused to be present by an operator, serves to impede the free slideability of chain link mating elements across said Lateral Slit, and in combination with other caused friction based braking effects, prevents in the first place, or stops a chain saw chain's motion.

Preferred practice is to have the continuous chain channel guide be in an offset position, from one side of a Lateral Slit to the other, unless a user purposely, by definite positive action, causes it to be aligned by the operation of an a continuous chain channel guide alignment means, thereby providing a chain saw which impedes the slideability of chain link mating elements across said Lateral Slit until desired, and specifically effected by a user.

Further, the preferred continuous chain channel guide alignment means is a dumbbell shaped element slideably mounted in the elongated support, such that in use said dumbbell shaped element causes alignment of the continuous chain channel guide means from one side of the Lateral Slit to the other, when caused to be located so as to span said Lateral Slit.

In a modified embodiment the previously disclosed system provides that there be a second Lateral Slit said continuous chain channel guide which allows effecting an offset of said continuous chain channel guide from one side of said second Lateral Slit to the other.

Just as for the first Lateral Slit, preferred practice is to require that said continuous chain channel guide be in an offset position, from one side of said second Lateral Slit to the other, unless a user causes it to be aligned by operation of continuous chain channel guide alignment means, thereby providing a chain saw which impedes the slideability of chain link mating elements across said lateral slit until desired by a user. While an alignment means which applies to a first Lateral slit might be sufficient to align channel regions on either side of two Lateral Slits, just as for the first Lateral Slit, when present, the preferred continuous chain channel guide alignment means is a second dumbbell shaped element slideably mounted in the elongated support, such that in use said second dumbbell shaped element causes alignment of the continuous chain channel guide means from one side of the slit to the other, when caused to be located at and span said Lateral slit.

Another modified embodiment of the previously disclosed system provides that it is a chain saw comprising a motor inside a housing, a blade or cutter providing chain saw chain comprised of links which include chain link mating elements, and an elongated support extending outward from inside said housing. Again, said motor and chain saw chain are functionally interconnected inside said housing such that operation of said motor applies motion producing force to said chain saw chain. And as before, in the outer surface of said elongated support there being present a continuous chain channel guide into which said chain link mating elements slideably insert, such that during normal operation said chain link mating elements slide essentially freely through said continuous chain channel guide when forced to do so by operation of said motor. Said modified embodiment, however, provides that said continuous chain channel guide has means present therein which allows effecting an impeded chain channel guide, said means which allows effecting an impeded chain channel guide, serving to, when operated, impede the slideability of chain saw chain therethrough. As before, said means which allows effecting an impeded chain channel guide can comprise at least one slit laterally thereacross, but in the modified embodiment comprises any means which allows effecting an impeded chain channel guide, such as at least one collapsible wall region comprised of, for instance, laminations which move when pressure is applied thereto, or perhaps at least one insertional element which is entered thereinto through a means for entering an insertional element, (which means can comprise a separate portion of said wall), or any functionally equivalent means which enables applying friction to a chain saw chain to slow and stop its motion.

It is to be understood that a lateral slit can be caused to offset from top to bottom, as viewed in side elevation instead or, or in addition to from side to side as viewed from the top.

The previously disclosed system includes chain saw systems with both the described braking related Lateral Slit(s), and the chain saw chain tensioning/braking related Longitudinal Slit in the elongated support.

A method of operating a chain including causing motion of a chain saw chain and the stopping thereof, comprises the steps of:

a) providing a chain saw comprising a housing, a chain comprised of links which include chain link mating elements and cutters, and an elongated support extending outward from inside said housing, in the outer surface of said elongated support there being present a continuous chain channel guide into which said chain link mating elements are slidably inserted, such that during normal operation said chain link mating elements slide essentially freely through said continuous chain channel guide when forced to do so;

said chain saw further comprising control means for causing an insertional element to extend into the continuous chain channel guide by being moved thereinto, said insertional element being affixed to a lever arm and being projected from said lever arm into a channel present in the plane of said elongated support which provides access to the chain channel guide, and said lever arm being pivotally connected to said elongated support and further having a brake operation handle affixed thereto such that in operation, when a user applies force to said brake operation handle said lever arm rotates about its pivotal connection to said elongated support thereby causing said insertional element to move in the channel present in the plane of said elongated support into which it projects and into said chain channel guide when braking of said chain saw chain motion is desired, and move out of said chain channel guide when braking of said chain saw chain motion is not desired;

said insertional element serving to apply braking to said chain when braking of said chain saw chain motion is desired, and not apply tension to said chain saw chain when braking of said chain saw chain motion is not desired.

Said method further comprises:

b. causing said insertional element to not be present in the continuous chain channel guide and causing said motor to cause said chain saw chain to slide essentially freely move therethrough;

c. causing said insertional element to be moved through said channel present in the plane of said elongated support which provides access to the chain channel guide and enter into said chain channel guide such that it contacts said chain saw chain, thereby impeding its motion.

The present invention will be better understood by reference to the Detailed Description, in conjunction with the Drawings.

DETAILED DESCRIPTION

It is first mentioned that the invention Claimed in this Application is found primarily in FIGS. 5*c*-5*h*, which are discussed in due course herein. The approach to the presentation in this Specification is to also provide material originally presented in Co-pending patent application Ser. Nos. 11/286,404, 10/047,402 and 09/853,942. This is done to provide general insight to previously disclosed invention by the same Inventor and to build a good general knowledge base regarding chain saws.

Figure 1C:
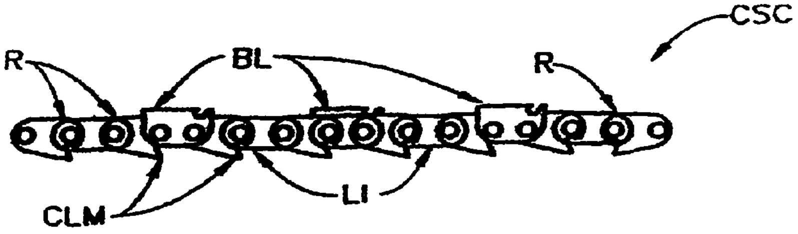
FIG. 1*c* shows an enlarged view of a typical chain saw chain, showing blades or cutters and chain saw sprocket engaging link mating elements (CLM).
Figure 1A:
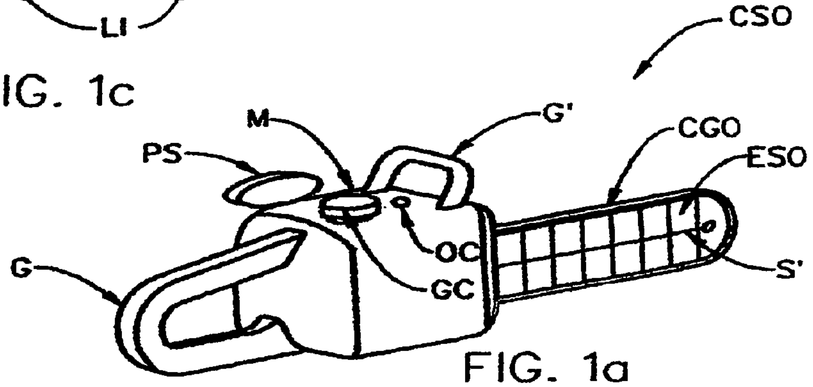
FIG. 1*a* shows a perspective view representation of a typical chain saw (CS) including a Motor in a housing (M), Pull Starter (PS), Gas Cap (GC) and Grips (G) and (G'), Elongated Support (ESO) and the Continuous Chain Channel Guide (CGO).

Turning now to FIG. 1*a*, there is shown a perspective view representation of a typical conventional Chain Saw (CSO) including a Motor contained in a housing (M), Pull Starter (PS), Gas Cap (GC), Oil Cap (OC) and Grips (G) and (G'). The aspect in FIG. 1*a* which distinguishes the present invention over prior art is the Longitudinal Slit (S') in the Elongated Support (ESO) which comprises the Continuous Chain Channel Guide (CGO) in the outer perimeter surface thereof. For general interest, FIG. 1*c* shows an enlarged view of a Chain Saw Chain showing Links (LI) with Blades or Cutters (BL) affixed thereto, and further showing the presence of Chain Link Mating Elements (CLM) which in use slideably insert into a Continuous Chain Channel Guide (CG). It is to be understood that adjacent Links (LI) in the Chain Saw Chain are interconnected as by means such as Rivets (R), and that said interconnection means allow for limited lateral motion between adjacent links.

Figure 1B:
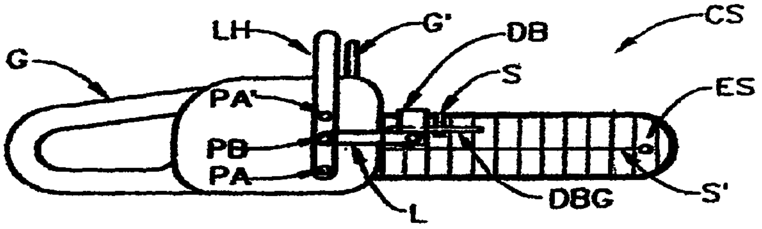
FIG. 1*b* shows the chain saw of FIG. 1 modified to include elements Lateral Slit (S) and Dumbbell Guide (DBG) which comprise the present invention.
Figure 2A:
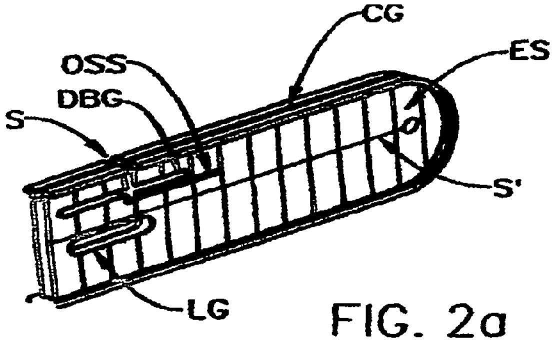
FIG. 2*a* shows a perspective partial view of the Elongated Support (ES) and Continuous Chain Channel Guide (CG) in FIG. 1*a* near where it enters the Motor containing housing (M).
Figure 2B:
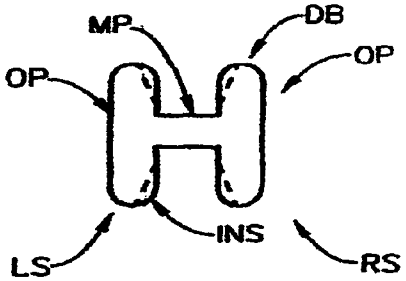
FIG. 2*b* shows a Dumbbell Shaped Element (DB) which is a preferred Continuous Chain Channel Guide Alignment Means.
Figure 3:
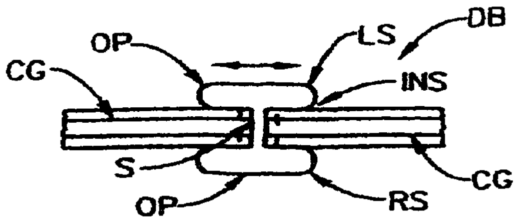
FIG. 3 provides an enlarged view showing application of a Dumbbell Shaped Element (DB) positioned to effect alignment of a Continuous Chain Channel Guide.
Figure 4:
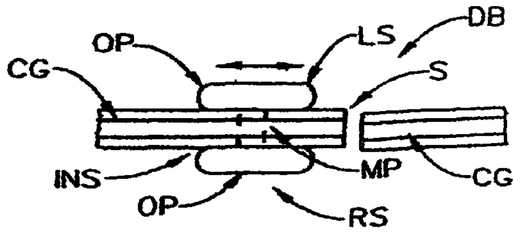
FIG. 4 shows an enlarged view showing Dumbbell Shaped Element (DB) positioned to allow non-alignment of a Continuous Chain Channel Guide.

FIG. 2*a* shows a perspective partial view of the Elongated Support (ES) and Continuous Chain Channel Guide (CG) similar to that in FIG. 1*a* near where it enters the Motor containing housing (M). Note the presence of a Lateral Slit (S) which is not present in conventional Chain Saw Elongated Support (ESO), as well as a Dumbbell Guide (DBG), the purposes of which will be described with respect to FIGS. 1*b* and 6. Before turning to FIGS. 1*b* and 6, however, attention is directed to FIGS. 3 and 4 which show a Top view looking down from above at the Continuous Chain Channel Guide (CG) in FIG. 1*a*, and also indicating the Lateral Slit (S) in FIG. 2*a*, and a preferred Continuous Chain Channel Guide Alignment Means, Dumbbell Shaped Element (DB), said Dumbbell Shaped Element (DB) being generally demonstrated in FIG. 2*b* as comprising Middle (MP), Outer (OP) and Inner Surface (INS) portions, which Inner Surface (INS) can be, at its outer extents, of a more tapered shape as indicated by the dashed lines such that when said more tapered Inner Surface (INS) regions engage the Channel Guide (CG) on both sides of a Lateral Slit (S), energy stored in the Channel Guide (CG) aides with forcing the Dumbbell (DB) away from said Lateral Slit (S). Note also that a Dumbbell Element (DE) could be single sided operating internally, (Half-a-Dumbbell shaped), where appropriate securing means are present. (For insight to what the terminology "Half-a-Dumbbell shaped" identifies it should be understood that deleting the Left Side (LS) or Right Side (RS), but not both, of a Dumbbell (DB) shown in FIG. 3 or 4 results in "Half-a-Dumbbell". Note that a Half-Dumbbell mounted internally would be practical as there would be no protrusion into the saw kerf. That is, it is not necessary for a Dumbbell Element (DB), or functionally equivalent element, to be of a shape so as to cradle the Continuous Chain Channel Guide (CG) on two sides in the vicinity of a Lateral Slit (S), to be within the scope of the present invention. This is easily understood as involving a Continuous Chain Channel Guide Alignment Means where only a left (LS) or right (RS) side of the Dumbbell Element (DB) in FIG. 2*b*, but not both, are present. Note in FIG. 4 that the Continuous Chain Channel Guide (CG) is shown to be offset, one side of the Lateral Slit (S) to the other. However, FIG. 3 shows that sliding the Dumbbell Shaped Element (DB) to the right, causes it to effect alignment of the Continuous Chain Channel Guide (CG) on both sides of the Lateral Slit (S). Note that the Middle Portion (MP) of the Dumbbell Shaped Element (DB) is shown in FIGS. 3 and 4 as dashed lines. Also note where the Inner Surface (INS) of the Dumbbell Shaped Element contacts the Channel Guide (CG) and, as alluded to, realize that a more tapered shape can be utilized to aid with smoothly aligning the two sides of the Channel Guide (CG) on either side of the Lateral Slit (S), as shown in FIG. 4. (Note that the side displacement is limited by the Continuous Chain Saw Channel Guide (CG) to (CLM) clearances and rivet (R) to (CLM) clearances. Dumbbell (DB) Taper permits easy reset since the displacement is relatively small. The spring force from the Horizontal Slit (DBG) and optionally (OSS) provides the driving force as the bar is biased to return to its free state). Further, it is within the scope of the present invention to provide only a Continuous Chain Channel Guide Alignment Means which comprises only one side, (eg. only the Right Side (RS) or Left Side (LS)), and still be functional.

It is noted at this point that a present invention will typically provide a Continuous Chain Channel Guide (CG) manufactured to be as shown in FIG. 4, when a Chain Saw (CS) is not being used. That is, the present invention provides that the Continuous Chain Channel Guide (CG), one side of the Lateral Slit (S) to the other, will be manufactured to be fixed in a relative offset position such that a Chain Link Mating element (CLM) mounted in the Continuous Chain Channel Guide (CG) will be impeded from sliding past said Lateral Slit (S) until a user causes the Continuous Chain Channel Guide (CG), one side of the Lateral Slit to the other, to become aligned as shown in FIG. 3. (Note that a horizontal slit (OSS) as shown in FIG. 2*a* might be required). Said offset Continuous Chain Channel Guide (CG) "impedance" comprises a Braking Force and is the underlying principle of operation of the present invention. The offset of the Continuous Chain Channel Guide (CG), one side of the Lateral Slit (S) to the other, it will be easily appreciated then, serves to impede Chain Link Mating Elements (CLM) in links in a Chain Saw Chain, which otherwise slide in said Continuous Chain Channel Guide (CG), from easily sliding across said Lateral Slit (S), until a user causes alignment, as shown in FIG. 3. As indicated, a preferred Alignment means is a Dumbbell Shaped Element (DB), as shown in FIG. 2*b*. In use the Middle Portion (MP) of said Dumbbell (DB) is slideably positioned in Dumbbell Guide (DBG) of FIG. 2*a*, and the Dumbbell Element (DB) Outer Portions (OP) extend so as to encompass the upper Continuous Chain Channel Guide (CG) containing portion of the Elongated Support (ES), as better shown in FIGS. 1*b* and 6. (Note that in FIG. 2*a* an Optional Slit (OSS) is indicated which can be present if the Dumbbell Guide (DBG) "slit" does not allow sufficient compliance to enable Channel Guide offset as demonstrated in FIGS. 3 and 4).

Figure 6:
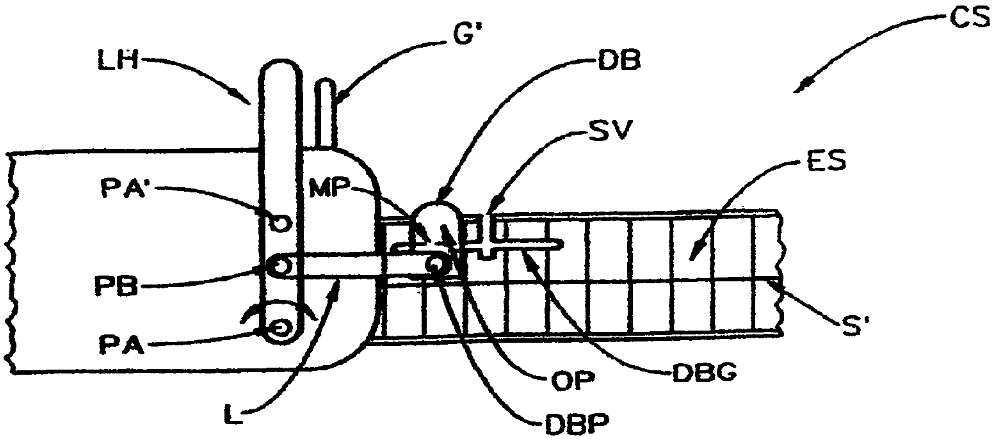
FIG. 6 provides an enlarged view of the present invention elements as identified in FIG. 2.

Continuing, FIG. 1*b* shows a side elevation view of a Chain Saw (CS), much as shown in FIG. 1*a* but with functionally demonstrative present invention system Lateral Slit (S), Dumbbell (DB), Linkage (L), and Leverage Handle (LH) added thereto. FIG. 6 provides an expanded view showing how the Leverage Handle (LH) can be pivotally mounted to the Chain Saw (CS) Motor (M) housing via Pivot (PA), (or (PA') depending on which direction the Leverage Handle (LH) is to move during operation of the braking effect), and that Pivot (PB) provides interconnection to Linkage (L) which in-turn is pivotally attached to Dumbbell Pivot (DBP), (which can be a loosely affixed connector as opposed to a firm pivot connector system), and Dumbbell Shaped Element (DB). Note that the Middle Portion (MP) of Dumbbell Pivot (DBP) is located on Dumbbell Shaped Element (DB) which is mounted in the Dumbbell Guide (DBG). The preceding discussion of FIGS. 3 and 4 provide insight that movement of the FIG. 6 Leverage Handle (LH) will cause it to pivot about Pivot (PA), and that will cause the Dumbbell Shape Element (DB) movement indicated in FIGS. 3 and 4. Note that the guide identified as (LG) is shown for completeness and is present on all chain saws. It is used in bar adjusting and tension adjusting. Note also that while FIG. 1*b* shows preferred relative orientation of the Leverage Handle (LH) and the Dumbbell Guide (DBG), any functional relative orientation therebetween can be utilized.

Figure 5A:
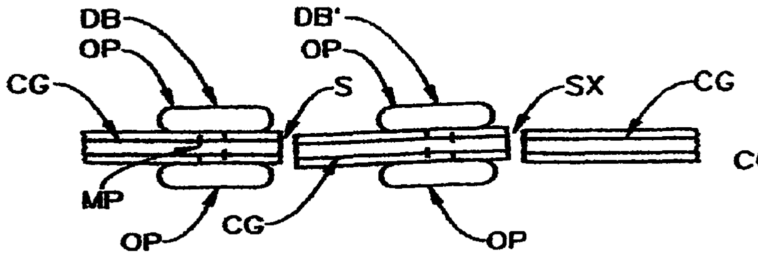
FIG. 5*a* shows an enlarged view of a scenario similar to that in FIG. 4, but for a double Lateral Slit (S) and (Sx) arrangement.
Figure 5I:
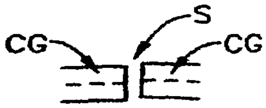
FIG. 5*i* shows a side view of a variation of a lateral slit arrangement wherein the two sides of the Continuous Chain Channel Guide (CG) are caused to change vertically with respect to one another.
Figure 5B:
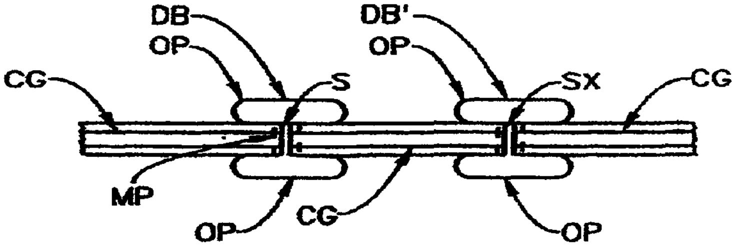
FIG. 5*b* shows an enlarged view of a scenario similar to that in FIG. 3, but for a double Lateral Slit (S) arrangement.

FIGS. 5*a* and 5*b* show another variation of the Lateral Slit (S) aspects of the present invention wherein two Lateral slits (S) and (Sx) are present in the Elongated Support (ES) in the region of the upper Continuous Chain Channel Guide (CG), and two Dumbbell Shaped Elements (DB) and (DB') are present. It is to be understood that additional linkage, (not shown, but can be internal so as not to interfere with the kerf or it could be out of the kerf inside the motor housing), which can be similar to that shown for the single Dumbbell Shaped Element (DB) case in FIGS. 1*b* and 6, will be required to cause the second Dumbbell Shaped Element (DB') to move as indicated in FIGS. 5*a* and 5*b*. As well, it is noted that a single Dumbbell Shaped Element (DB), or functional equivalent, can suffice even in the presently disclosed embodiment, as aligning the Channel Guide (CG) on both sides of one Lateral Slit (S) will tend to align it on both sides of the second Lateral Slit (Sx). FIG. 5*i* shows a side view of a variation of a lateral slit arrangement wherein the two sides of the Continuous Chain Channel Guide (CG) are caused to be offset vertically with respect to one another. This can be effected as a permanent configuration, and thereby serve to smooth out an abrupt Continuous Channel Guide (CG) variation, (as seen by a Chain Saw Chain (CSC). Additionally, where the vertical offset is adjustable, it can also serve to impede Chain Saw Chain (CSC) motion by contact between Chain Saw Chain (CSC) and the Lateral Slit (S) edge. Any linkage for effecting the vertical motion is within the scope of the present invention, but can include a system similar to that shown in FIGS. 10*a* and 10*b* for application to a Longitudinal Slit (S'), where said similar system would be oriented instead near the lateral Slit (S).

Figure 5C:
FIGS. 5*c* and 5*d* demonstrate a Continuous Chain Channel Guide (CG') which contains a collapsible region (COL) situated in non-collapsed and collapsed configurations respectively.
Figure 5D:

As additional insight, FIGS. 5*c* and 5*d* demonstrate a Continuous Chain Channel Guide (CG') which contains a Collapsible region (COL) situated in non-collapsed and collapsed configurations respectively. Said Collapsible region (COL) can be comprised of laminations which various activating means can cause to move and thereby collapse the Continuous Chain Channel Guide (CG'), but which laminations retain memory and so return to their "un-collapsed" shape when collapsing force is removed. Said alternative "means which allows effecting an impeded chain channel guide from one side thereof to the other", is to be considered within the scope of the Claimed invention as functionally essentially equivalent to the Lateral Silt (S) as in use it serves to stop a chain saw chain from sliding therein. It is noted that only one side of the Continuous Chain Channel Guide (CG') as shown in FIGS. 5*c* and 5*d* might be made collapsible and remain in the scope of the present invention, or that the Collapsible region (COL) can simply comprise a movable portion of the wall on one side of the Continuous Chain Channel Guide (CG'). Any functional linkage can be applied to effect the action demonstrated in FIGS. 5*c* and 5*d*.

Figure 5E:
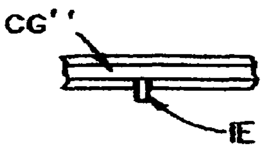
FIGS. 5*e* and 5*f* shows alternative means for impeding a chain saw chain slideability in a Continuous Chain Channel Guide (CG"), comprising an insertion element (IE).
Figure 5F:
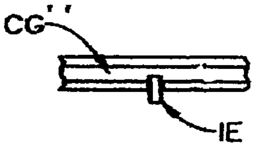

FIGS. 5*e* and 5*f* show yet another alternative means for impeding a chain saw chain slideability in a Continuous Chain Channel Guide (CG") comprising an Insertion Element (IE) which can be entered and removed to the Continuous Chain Channel Guide (CG") via a means for entering said Insertion Element (IE), (eg. a hole in the wall of the Continuous Chain Channel Guide (CG")), by any functional linkage. Note that the Insertion Element (IE) can simply comprise a small part of the wall of the Continuous Chain Channel Guide (CG'), which wall is laterally movable.

Figure 5G:
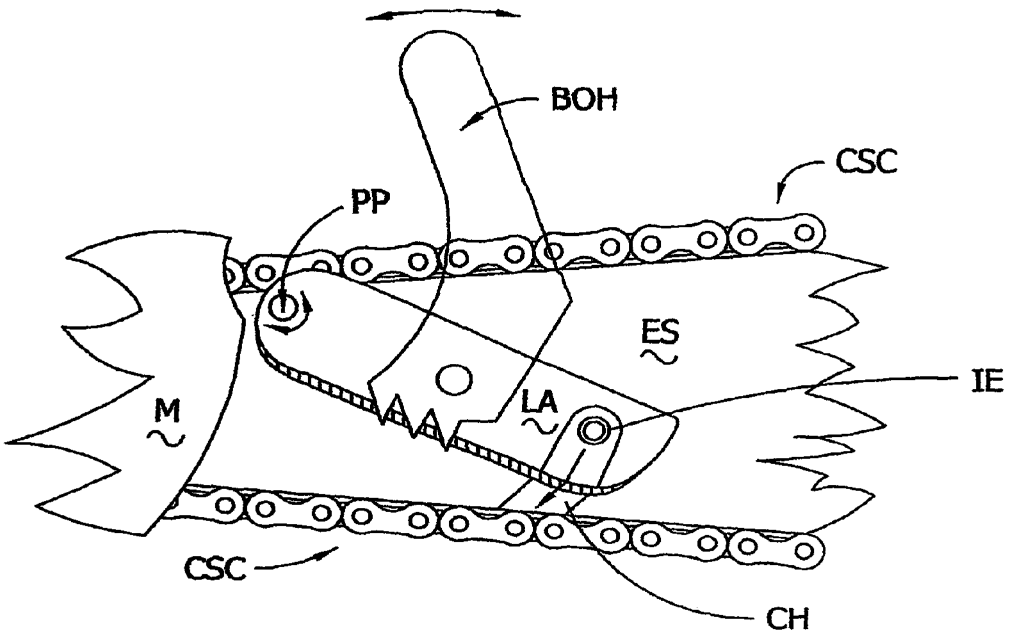
FIGS. 5*g* and 5*h* show a variation on the approach in FIGS. 5*e* and 5*f*.
Figure 5H:
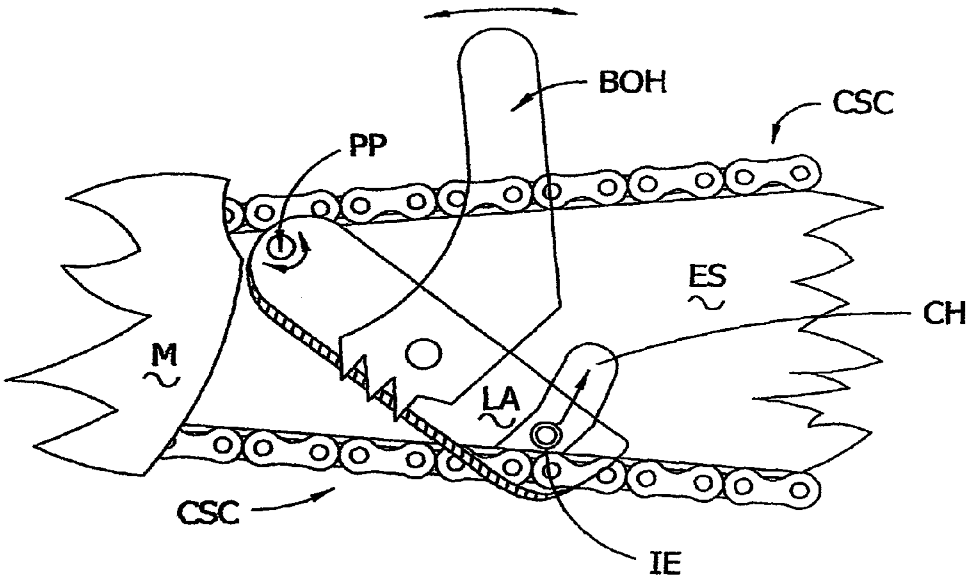

FIGS. 5*g* and 5*h* show a variation on the approach in FIGS. 5*e* and 5*f* wherein the Insertion Element (IE) is attached to a Lever Arm (LA) which pivots about a Pivot (PP) when a user causes it to so rotate by applying force to a Brake Operation Handle (BOH). FIG. 5*g* shows the "Brake Off" condition wherein the Insertion Element (IE) is rotated so as not to contact a Chain Saw Chain (CSC) Link, and FIG. 5*h* shows the "Brake On" condition wherein the Insertion Element (IE) is rotated so as to contact a Chain Saw Chain (CSC) Link, specifically a Chain Link Mating Element (CLM) thereof. While shown outside the Motor Housing (M) to demonstrate function, it is noted that preferred practice places the Lever Arm (LA) at least partially inside thereof. That is, the Motor Housing (M) can be considered to extend to the left in both FIGS. 5*g* and 5*h* to enclose the Lever Arm (LA), with the Brake Operation Handle (BOH) then extending vertically out thereof. It should be appreciated that causing the Brake Operation Handle (BOH) to rotate clockwise in FIGS. 5*g* and 5*h* causes the Insertion Element (IE) to move outwardly through a Channel (CH) that is present in the plane of the Elongated Support (ES) which Channel (CH) provides access to the Chain Channel Guide (CG). This outward movement causes the Insertion Element (IE) to contact one of the Chain Link Mating Elements (CLM) of the Chain Saw Chain (CSC) Link. Additionally it should be appreciated that causing the Brake Operation Handle (BOH) to rotate counterclockwise in FIGS. 5*g* and 5*h* causes said Insertion Element (IE) to move away from the Chain Saw Chain (CSC) and inwardly through the Channel (CH).

A similar Control System can be applied to the embodiments of FIGS. 5*c*-5*f*, but the force applied to an equivalent to the Brake Operation Handle (BOH) is caused to be directed laterally so that the Insertion Element (IE) shown in said Figures moves into and out of the plane of the paper, as shown. (Note that for the purposes of Claim construction, the Collapsible (COL) region in FIGS. 5*c* and 5*d* is to be considered an Insertion Element (IE) as shown in FIGS. 5*e*-5*h*).

It is noted that FIGS. 5*c*-5*f* demonstrate systems in which a collapsible region or insertion element is caused to enter a Continuous Chain Channel Guide (CG) in a "laterally" oriented direction, which FIGS. 5*g* and 5*h* show a system in which a Continuous Chain Channel Guide (CG) has an Insertion Element (IE) entered thereinto in a "Vertically" oriented direction. In either case the effect is to impede the motion of a contacted Chain Saw Chain (CSC) so as to effect braking thereof.

It is noted that FIGS. 5*c*-5*h* show the presently Claimed invention.

Continuing, FIGS. 1-6 serve to show how the Lateral Slit (S) braking function of the present invention functions with relevant examples. However, it can be appreciated that if the means for impeding a chain saw chain slideability in a Continuous Chain Channel Guide (CG), (eg. Lateral Slit (S) and associated Dumbbell Guide (DBG), Dumbbell Shaped Element (DB) and Linkage (L)), are positioned within the Motor Housing (M), they would be less susceptible to damage. Further it is emphasized that any functional linkage between the Leverage Handle (LH), or a functional equivalent thereto, can be substituted in FIGS. 1*b*, 6 and 7 and the result will remain within the scope of the present invention. For instance, the Leverage Handle (LH) could be mounted to a Chain Saw Power Head, Cutter bar, etc. That is, in FIGS. 1-6 it is primarily the Lateral Slit (S) functional chain saw chain motion impedance effecting means, present in the Elongated Support (ES), (typically in the region of the upper Continuous Chain Channel Guide (CG)), and functional utility provided thereby, which comprises the novelty.

It is noted that the Lateral Slit (S) in FIGS. 1-6 can be fashioned to have edges which are radiused to reduce an abrupt chain link collision effect. A gradual shape can also serve to place additional links into contact with an offset Continuous Chain Channel Guide (CG) during braking.

Figure 7:
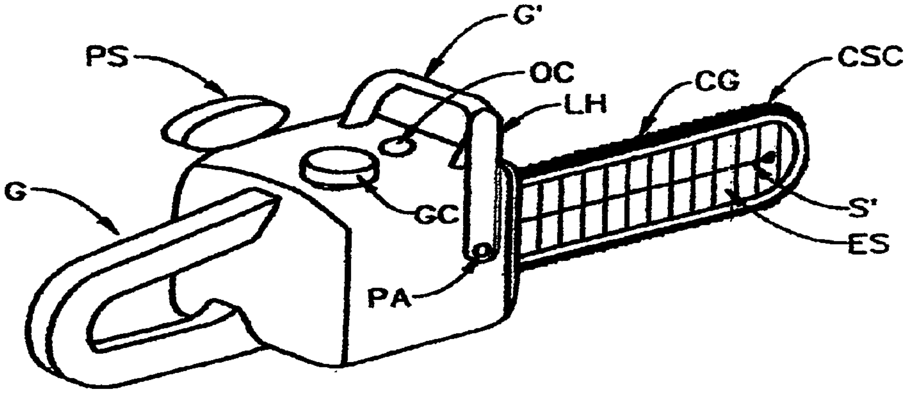
FIG. 7 shows a modified embodiment of the present invention wherein the Lateral Slit (S) and Dumbbell Guide (DBG) etc. are present inside the Motor containing Housing (M).

FIG. 7 shows a modified embodiment of the present invention implying, by the presence of the Leverage Handle (LH), that all the other elements, (eg. Lateral Slit (S), Dumbbell Guide (DBG) and Dumbbell (DB)), are present inside the protective motor containing Housing (M).

Disclosed then is Chain Saw Chain (CG) tension and braking utility enabled by the presence of a Longitudinal Slit (S') in the Elongated Support (ES) of a chain saw (CS). The present invention is enhanced by braking utility enabled by the presence of a Lateral Slit (S) in the Elongated Support (ES).

The approach to Disclosure of the invention in this Section is to first focus on the primary aspect of the present invention, namely the presence of a Longitudinal Slit (S') in an Elongated Support (ES) of a Chain Saw (CS) System, (see FIGS. 8*a*-10*b*), and then follow up by presenting the Disclosure from co-pending patent application Ser. No. 09/853,942. The latter provides context for understanding where in a Chain Saw (CS) such as the Elongated Support (ES) referred to in FIGS. 8*a*-10*b* is located. This approach is used to make clear that the present invention Longitudinal Slit (S') based chain saw chain tensioning and braking invention is complimentary to the previously disclosed Lateral Slit (S) based chain saw chain braking invention.

Turning to FIGS. 8*a*-10*b*, it is to be appreciated that they show the presence of a Longitudinal Slit (S') in an Elongated Support (ES) of a Chain Saw (CS). The purpose of said Longitudinal Slit (S') is to allow tensioning of a Chain Saw Chain which is slideably present in a Continuous Chain Channel Guide (CG) in the outer perimeter surface of said Elongated Support (ES) by the effecting of separation between Upper (UP) and Lower (LP) portions of said elongated support (ES), thereby the causing of a "stretching" of the Chain Saw Blade, such that when said stretching is appropriate, the chain saw chain is properly tensioned to facilitate motion of said Chain Saw blade.

Figures 8A, 8B, 8C, 8D, 8E:
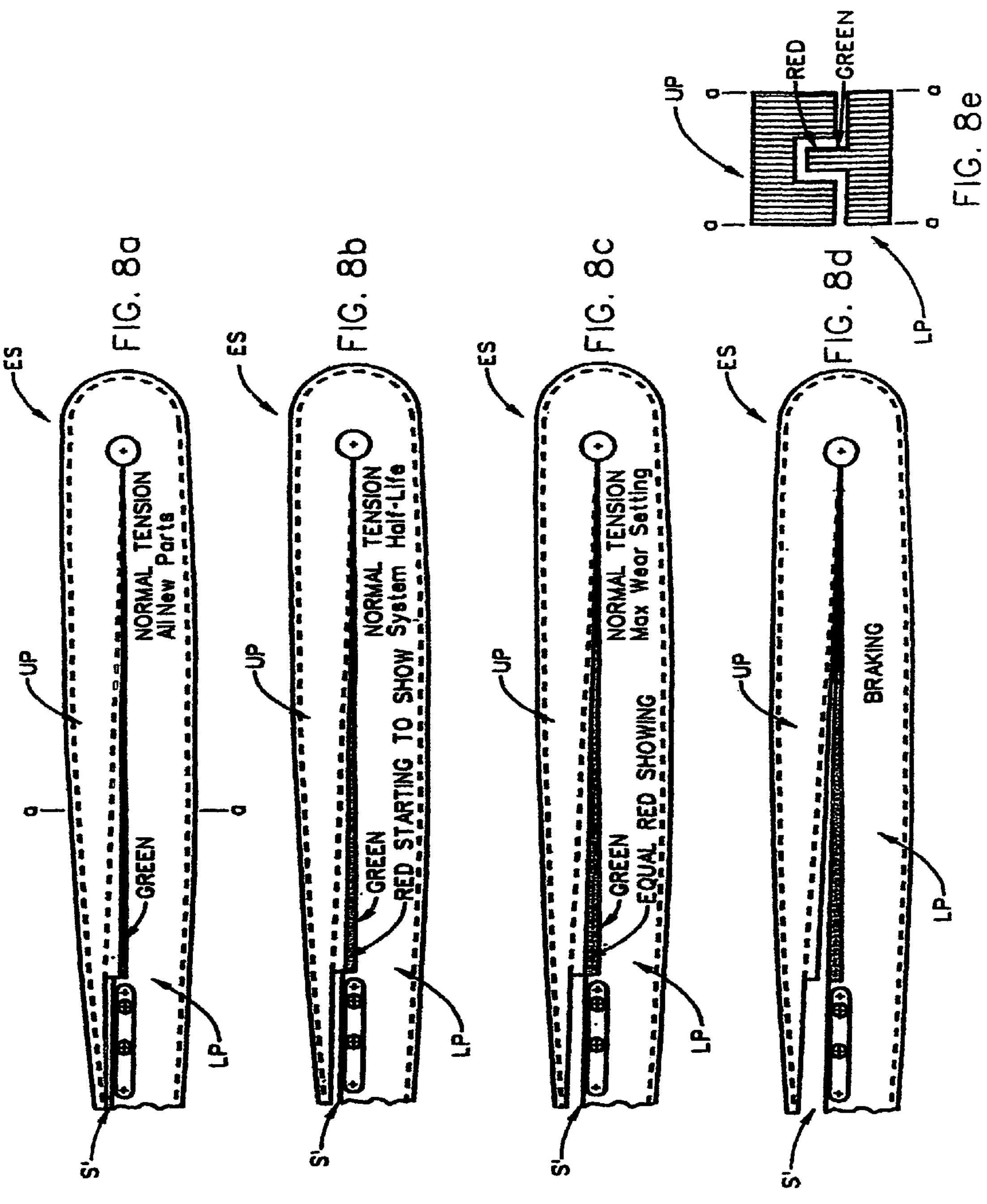
FIGS. 8*a*-8*d* shows a longitudinally oriented slit (S') in an elongated member of a chain saw, for various Longitudinal Slit widths, from that to effect normal tension in a new system, to that which would effect braking of chain saw chain motion.
FIG. 8*e* shows an expanded scale, partial side cross-sectional view taken at "a-a" in FIG. 8*a*, showing groupings of laminations with the central group of laminations projecting between the outer two groupings.

FIGS. 8*a*-8*d* shows a longitudinally oriented Slit (S') in an Elongated Support (ES) of a chain saw, for various Longitudinal Slit (S') widths, from that to effect normal chain saw chain tension in a new system, (see FIG. 8*a*), to that which would effect braking of a chain saw chain motion (see FIG. 8*d*). Note that the Elongated Support (ES) can comprise a single element but as a non-limiting example is demonstrated to be comprised of laminations. FIGS. 8*a*-8*d* also indicate three laminations wherein a middle lamination is be sandwiched between two outer laminations, and that said middle lamination can be of two colors, Green and Red with the Red being positioned above the Green as viewed in said FIGS. 8*a*-8*d*. FIG. 8*a* has only the Green visible, which indicates normal tensioning in a new system requires very little Longitudinal Slit (S') width. FIG. 8*b* indicates that the Longitudinal Slit (S') width, to provide functional chains saw chain tensioning, has increased such that some Red is showing, which indicates that the chain saw system is at approximately half-life. FIG. 8*c* shows equal amounts of Red and Green showing when the Longitudinal Slit (S') is of a dimension sufficient to provide functional chain saw chains tensioning. This indicates that chain saw system servicing is required. FIG. 8*d* indicates that the Longitudinal Slit (S') is of a large dimension which is sufficient to cause Braking of a chain saw chain. Note also that FIG. 8*a* can be interpreted to represent a Longitudinal Slit (S') which is in a Normally Closed (NC) configuration and FIG. 8*d* can be interpreted to represent a Longitudinal Slit (S') which is manufactured to be in a Normally Open (NO) configuration in its free state. As indicated in FIGS. 9*a*, 9*b* and 10*a*, 10*b* Internal or External controllers then serve to modify the actual width dimension of the Longitudinal Slit (S') between closed in FIGS. 9*a* and 10*a*, and open in FIGS. 9*b* and 10*b*.

FIG. 8*e* shows an expanded scale partial side cross-sectional view taken at “a-a” in FIG. 8*a*, showing groupings of laminations with the central group of laminations projecting between the outer two groupings. The outer surface of the central grouping of laminations is preferably vertically half green and half red as indicated in FIG. 8*c*.

Figure 9B:
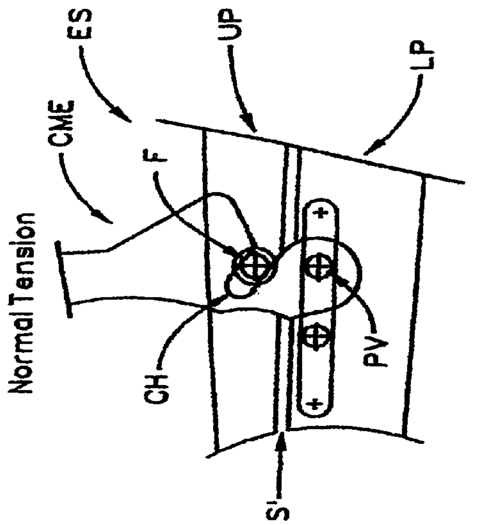
FIGS. 9*a* and 9*b* show a control means (CME) which is external to the Longitudinal Slit (S'), for two settings of Longitudinal Slit (S') width.
Figure 9A:
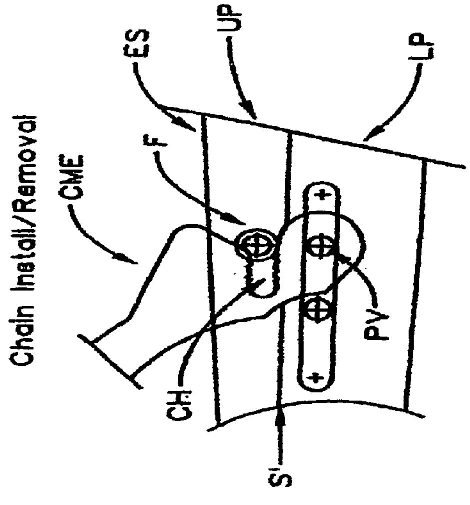

FIGS. 9*a* and 9*b* show an External Control Means (CME) which is functionally affixed “externally” on both sides of the Longitudinal Slit (S') in the Elongated Support (ES), for use in setting of Longitudinal Slit (S') width to adjust chain tensioning and/or chain braking. The two rotational positions of the External Control Means (CME) around Pivot (PV) in the Lower Portion (LP) of the Elongated Support (ES), shown in FIGS. 9*a* and 9*b* respectively, indicate how Longitudinal Slit (S') width is changed by interaction between Fixed Point (F) on Upper Portion (UP) of the Elongated Support (ES), and a Channel (CH) in said External Control Means (CME). Any equivalent “external to the Longitudinal Slit (S')” External Control Means (CME), and (CME) position securing means therefore, is to be considered equivalent and within the scope of the present invention. Note that FIGS. 9*a* and 9*b* demonstrate a Longitudinal Slit (S') which can be Normally Open (NO) or Normally Closed (NC) as manufactured, in its free state.

Figure 10B:
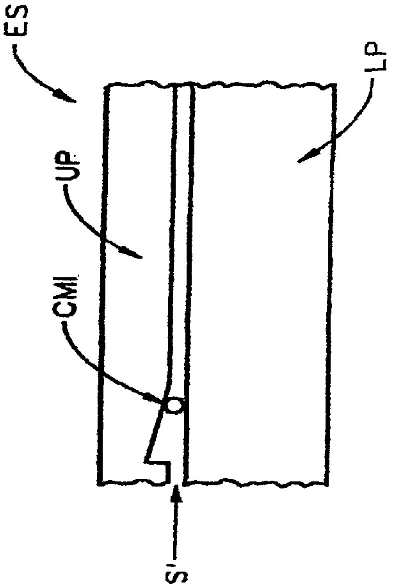
FIGS. 10*a* and 10*b* show a control means (CMI) which is internal to the Longitudinal Slit (S'), for two settings of Longitudinal Slit (S') width.
Figure 10A:
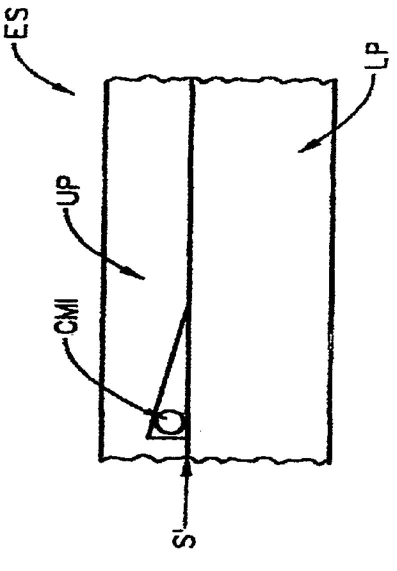

FIGS. 10*a* and 10*b* show an Internal Control Means (CMI) which is “internal” to the Longitudinal Slit (S'), for use in setting of Longitudinal Slit (S') width. It should be appreciated that sliding the Internal Control Means (CMI) between the positions shown in FIGS. 10*a* and 10*b*, has the same effect on Longitudinal Slit (S') width as does rotating the External Control Means (CME) shown in FIGS. 9*a* and 9*b*. Any additional control linkage and securing means to position and secure (CMI), or any functionally equivalent Internal Control Means (CMI) is within the scope of the present invention. Note that FIGS. 10*a* and 10*b* demonstrate a Longitudinal Slit (S') which will be Normally Closed (NC) as manufactured, in its free state.

It is emphasized that FIGS. 9*a*, 9*b*, 10*a* and 10*b* are to be considered demonstrative and not limiting examples of how a Longitudinal Slit (S') width can be controlled.

Figure 11:
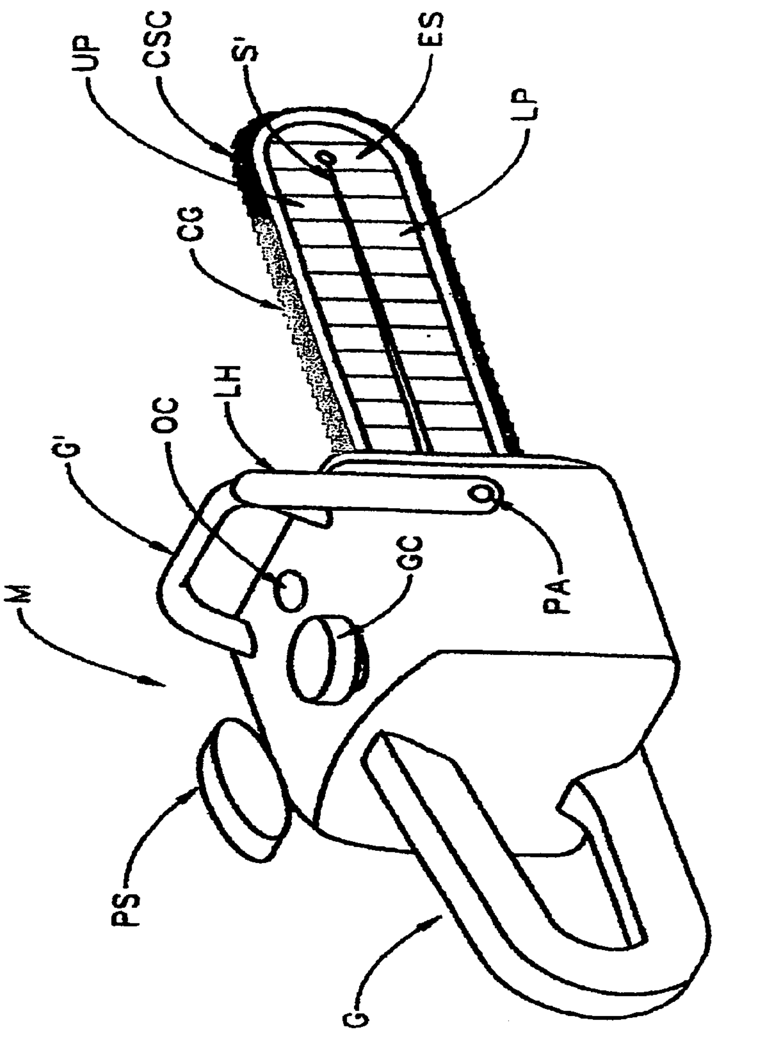
FIG. 11 is FIG. 7 with the Elongated Support (ES) Longitudinal Slit (S') increased to spread the Upper (UP) and Lower (LP) portions to add tension to the chain saw chain (CG).

FIG. 11 is FIG. 7 with the Longitudinal Slit (S') spread open, by the lowering of the Lower Portion (LP) of the Elongated Support (ES) at the point where it exists from the Motor Housing (M). This separates the Upper (UP) and Lower (LP) Portions, thereby adding tension to the chain saw chain (CG). It should be appreciated that it is generally preferable to move the Upper Portion (UP) as in use said Upper Portion (UP) is not loaded. Note the FIGS. 9*a*-10*b* Control Means (CME) or (CMI) are to be considered present within the Motor Housing (M), and that other identifiers in FIG. 11 are described with respect to FIG. 7.

It should be appreciated that, for orientation, the location the Longitudinal Slit (S') is generally shown in FIGS. 1*a*, 1*b*, 2*a*, 6, and 7. Further, it should be understood that, as the topic in co-pending application Ser. No. 09/853,942, the Longitudinal Slit (S') need not be present in conjunction with the Lateral Slit (S) shown in said FIGS. 1*a*, 1*b*, 2*a*, 6, and 7.

Figure 13:
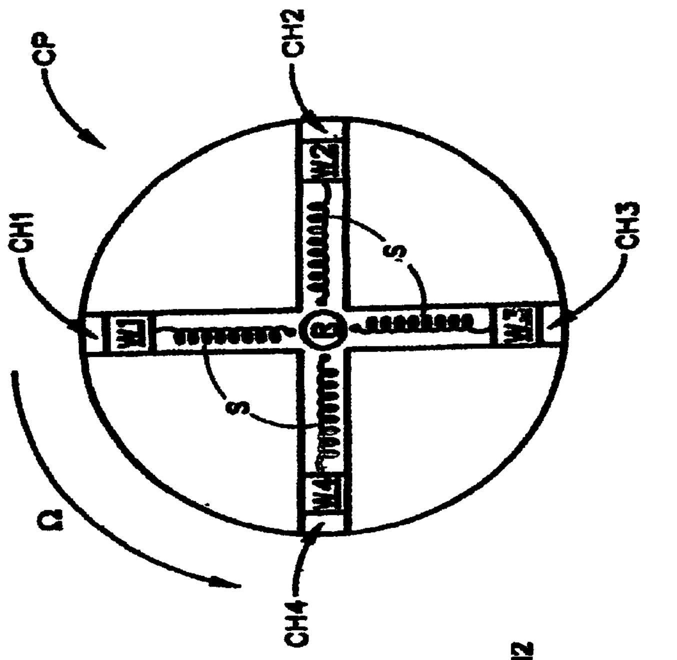
FIGS. 12 and 13, there is demonstrated a Clutch Plate (CP) with four Channels (CH1), (CH2), (CH3) and (CH4) present therein.
Figure 12:
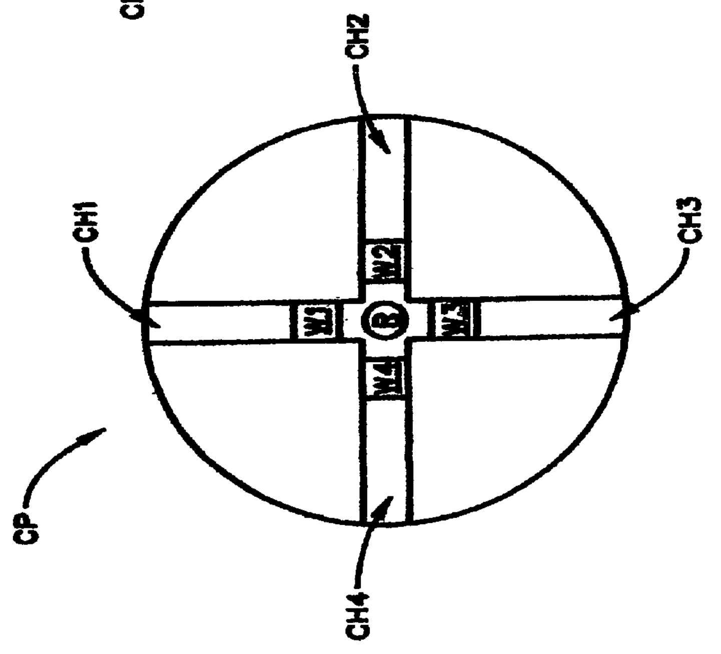

Turning now to FIGS. 12 and 13, there is demonstrated a Clutch Plate (CP) with four Channels (CH1), (CH2), (CH3) and (CH4) present therein. In said Channels (CH1), (CH2), (CH3) and (CH4) are slideably secured, respectively, Wedges (W1), (W2), (W3) and (W4). Note the Rod (R) is shown present centrally. In FIG. 12 said Rod (R) is stationary and in FIG. 13 Rod (R) is shown rotating at an angular velocity of Omega ( ) Note that Wedges (W1), (W2), (W3) and (W4) are centrally disposed in FIG. 12, but via centrifugal force are moved radially outward in FIG. 13. FIG. 13 also indicates that Springs (s) can be present to cause the Wedges (W1), (W2), (W3) and (W4) to again move centrally when the angular velocity Omega ( ) is stopped, or at least below the centrifugal threshold of extension.

Figure 15:
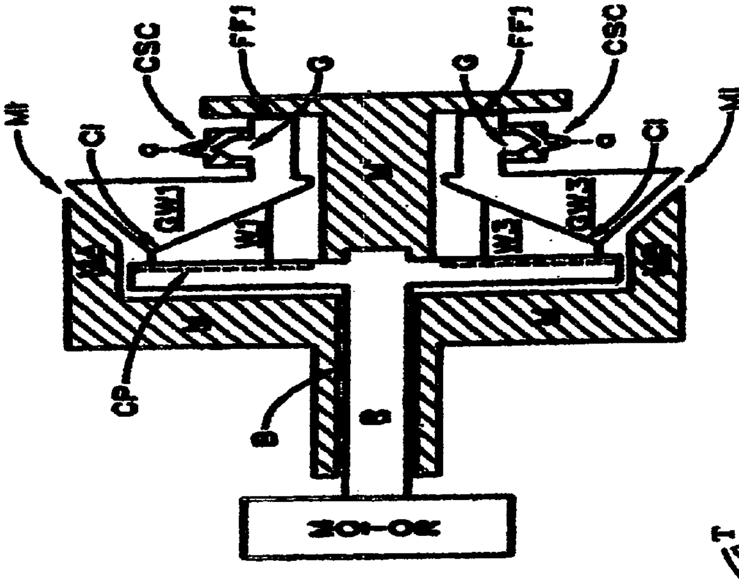
FIGS. 14 and 15 show functional application of the Clutch Plate (CP) of FIGS. 12 and 13, with Wedges (W1) and (W3) being visible in side elevation.
Figure 14:
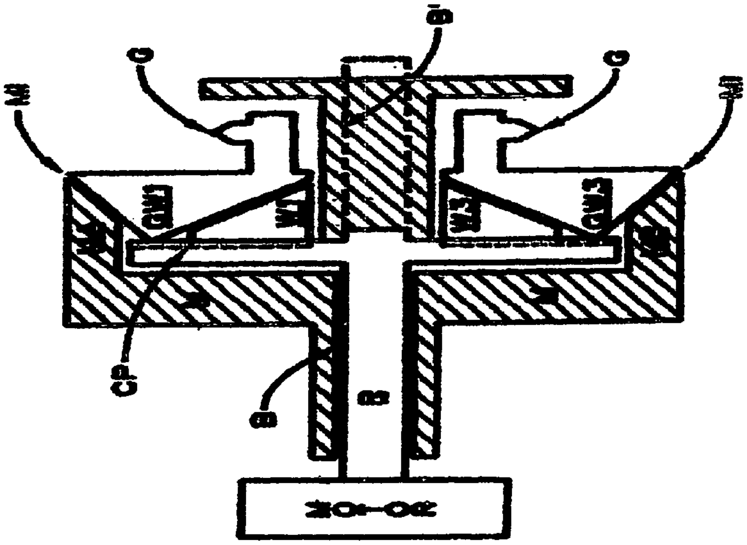
Figure 16:
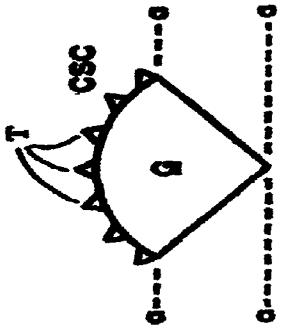
FIG. 16 shows a Gear (G) taken in cross-section at a-a in FIG. 14.

FIGS. 14 and 15 show functional application of the Clutch Plate (CP) of FIGS. 12 and 13, with Wedges (W1) and (W3) being visible in side elevation. Shown is indication of a Motor, with a Rod (R) projecting therefrom and through a Bearing (B) in a Frame (M), said Rod (R) being continuous with the Clutch Plate (CP). Shown in FIG. 14 are Gear Wedges (GW1) and (GW3) and Wedges (W1) and (W3), said Wedges (W1) and (W3) being positioned as shown in FIG. 12. Note that a Chain Saw Chain (CSC) driving Gears (G) are shown affixed to each of Gear Wedges (GW1) and (GW3). FIG. 15 shows Wedges (W1) and (W3) positioned as shown in FIG. 13 as caused by Rod (R) rotation. Note that Gear Wedges (GW1) and (GW3) are moved to the right in FIG. 15 as compared to their position in FIG. 14. It is in this position a Chain Saw Chain (CSC) can be driven via meshing of the Gear (G) and Chain Saw Chain (CSC). FIG. 16 shows a Gear (G) taken in cross-section at a-a in FIG. 15 can comprise many “teeth” (T) and be of a quarter circle shape as shown. Each of the shown Gear Wedges (GW1) and (GW3) and similar Gear Wedges (GW2) and (GW4), (not shown) can have such a Gear (G) affixed thereto. Note that a single piece 360 degree circular Gear can be utilized where four quadrant Gear (G) elements as shown in FIG. 16 are functionally combined.

Also shown in FIG. 14 are magnetic poles (MA) and (MB) which contact Gear Wedges (GW1) and (GW3) respectively via Magnetic Interface (MI). This Interface is comprised of materials which provide high contact friction which serves to “brake” motion. The use of magnetic attraction between the Poles (MA) and Gear Wedge (GW1) and between Pole (MB) and Gear Wedge (GW3) to effect enhanced friction is a novel aspect of the disclosed invention.

FIG. 15 shows a Clutch Interface (CI) between Wedge (W1) and Gear Wedge (GW1) and between Wedge (W3) and Gear Wedge (GW3). These interfaces are of a nature sufficient to cause Gear Wedges (GW1) and (GW3) to rotate when Wedges (W1) and (W3) are rotated. FIG. 15 also shows a “Friction-Free” Interface (FFI) between the projection from Gear Wedges (GW1) and (GW3) and their contact with Frame (M'). While the (FFI) contact is, of course, not completely friction free, it is constructed to provide minimum friction, in definite contrast to the Magnetic Interface (MI) indicated in FIG. 14.

FIG. 14 indicates in dashed lines that Rod (R) can be elongated and secured within a Bearing (B'). Such might be done where the Motor Housing (M) is not utilized to house the shown bearing (B) through which said Rod (R) is shown projecting, or where additional Bearing (B') support is desired. This, it is noted, enables securing the Magnetic Poles (MA) (MB) to alternative support. Thus, the disclosed invention can provide magnetic material supported in what is termed the Motor Housing and/or a Clutch Housing and/or by any functional support means; or the Motor Housing per se. can be made at least partially of magnetized material. In this light the terminology "clutch housing" and "motor housing" and "housing" generally should be interpreted broadly in the Claims where support of magnetized material is the intended purpose, to include any functional Patentably distinct approach to the mounting and support thereof.

Importantly it is noted that while FIGS. 5*e*-5*h* variously show the Insertional Element (IE) positioned to approach the Chain Saw Chain (CSC) from the sides and from atop, any angle of approach at which it extends into to a continuous chain channel guide is to be considered as covered by the Claims.

It is noted that a great safety enhancing benefit of operation of the present invention braking systems of FIGS. 12-18 is prevention of "Free-Wheeling" of the Gear (G) and Chain Saw Chain (CSC) after power from the Motor (M) is reduced. Without such, when a Motor is powered-back to idle, a moving Chain can continue to move for some time thereafter.

Finally, while the Drawings show paired balanced Wedges (W1) and (W3) and Gear Wedges (GW1) (GW3), it is of course possible, though perhaps not preferred, for there to be a single Wedge (W1) or (W3) provided to interact with a single Gear Wedge (GW1) or (GW3), to interact with and cause motion of the Gear (G).

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A method of operating a chain saw including causing motion of a chain saw chain and stopping the motion of the chain saw chain, comprising the steps of:

a) providing a chain saw comprising a housing, a chain saw chain comprised of links which include chain link mating elements and cutters, and an elongated support extending outward from inside said housing, in the outer surface of said elongated support there being present a continuous chain channel guide into which said chain link mating elements are slidably inserted such that during normal operation said chain link mating elements slide essentially freely through said continuous chain channel guide when forced to do so;

said chain saw further comprising a brake for stopping the chain saw chain, the brake comprising an insertion element and control means for causing said insertion element to move into a substantially fixed braking position in the continuous chain channel guide, said control means including a lever arm, said insertion element being affixed to said lever arm and extending from said lever arm into a channel present in the plane of said elongated support, the channel providing access to the chain channel guide, and said lever arm being pivotally connected to said elongated support, said control means further including a brake operation handle affixed to said lever arm such that in operation, when a force is applied to said brake operation handle, said lever arm rotates about its pivotal connection to said elongated support thereby causing said insertion element to move through the channel, wherein said force applied in a first direction causes movement of said insertion element through said channel and into said chain channel guide when braking of said chain saw chain motion is desired, and said force applied in an opposite second direction causes movement of said insertion element away from said chain channel guide and through said channel when braking of said chain saw chain motion is not desired;

said insertion element serving to apply braking to said chain saw chain when braking of said chain saw chain motion is desired, and to not contact said chain saw chain when braking of said chain saw chain motion is not desired, said chain link mating elements having structure that is configured to cooperate with the insertion element such that contact therebetween prevents relative movement between the insertion element and the chain link mating elements, wherein said braking is applied by said insertion element being disposed in said substantially fixed braking position intersecting a path of said chain link mating elements within said chain channel guide, such that when said insertion element intersects said path, said insertion element is substantially fixed with respect to the direction of movement of said chain saw chain along said path and abuts one of said chain link mating elements to block movement of the chain link mating element and stop the motion of the chain saw chain;

b. allowing the chain saw chain to move free of braking by causing said insertion element to be in a substantially fixed non-braking position so as to not be present in the continuous chain channel guide and causing the motion of said chain saw chain to cause said chain saw chain to slide essentially freely through said chain channel guide while said insertion element is in said substantially fixed non-braking position; and c. braking the chain saw chain by causing said insertion element to be moved through said channel present in the plane of said elongated support which provides access to the continuous chain channel guide and enter into said chain channel guide such that said insertion element is in said substantially fixed braking position wherein it contacts and blocks movement of one of said chain link mating elements and stops the motion of said chain saw chain.

* * * * *